US007168302B2

(12) United States Patent
Nakoji

(10) Patent No.: US 7,168,302 B2
(45) **Date of Patent: *Jan. 30, 2007**

(54) DIAGNOSTIC DEVICE OF EVAPORATED FUEL PROCESSING SYSTEM AND THE METHOD THEREOF

(75) Inventor: Yasushi Nakoji, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 162 days.

This patent is subject to a terminal disclaimer.

(21) Appl. No.: 10/926,295

(22) Filed: Aug. 26, 2004

(65) Prior Publication Data

US 2005/0044940 A1 Mar. 3, 2005

(30) Foreign Application Priority Data

Aug. 28, 2003 (JP) ............................ 2003-304914

(51) Int. Cl.
*G01M 19/00* (2006.01)
*G01M 3/04* (2006.01)

(52) U.S. Cl. ...................................... 73/118.1; 73/49.7

(58) Field of Classification Search ............... 73/118.1, 73/49.7
See application file for complete search history.

(56) References Cited

U.S. PATENT DOCUMENTS 4,532,795 A * 8/1985 Brayman et al. .............. 73/40
5,396,873 A * 3/1995 Yamanaka et al. .......... 123/520
6,289,880 B1 9/2001 Yamaguchi et al.
2005/0022588 A1* 2/2005 Hayakawa et al. ........ 73/118.1

FOREIGN PATENT DOCUMENTS

| | | |
|---|---|---|
| JP | 2001-041116 | 2/2001 |
| JP | 2003-056417 | 2/2003 |

OTHER PUBLICATIONS

Copending application, being filed concurrently herewith (Aug. 26, 2004) entitled "Diagnostic Device of Evaporated Fuel Processing System and the Method Thereof" and claiming JP 304924 priority.

(Continued)

*Primary Examiner*—Michael Cygan
(74) *Attorney, Agent, or Firm*—Smith, Gambrell & Russell LLP

(57) ABSTRACT

An inside of an evaporated fuel processing system including a fuel tank is closed after changing an internal pressure of the evaporated fuel processing system to a target pressure value. After the closing, a diagnostic section variably sets a start timing for calculating a pressure change within the evaporated fuel processing system based on a timing when the internal pressure of the evaporated fuel processing system changes from the target pressure value to a peak pressure value. Then, a change amount between the respective internal pressure values detected by a detector at the set start timing and at a termination timing, which comes after the start timing, is calculated. The diagnostic section diagnose a leak within the evaporated fuel processing system based on the calculated change amount. Thus, the variably set start timing allows the diagnosis time to be shortened.

22 Claims, 6 Drawing Sheets

OTHER PUBLICATIONS

Copending U.S. Appl. No. 11/085,272, filed Mar. 22, 2005, entitled "Diagnostic Apparatus for Evaporative Emission Control System", and claiming JP 2004-093477 priority.

Copending U.S. Appl. No. 10/926,296, filed Aug. 26, 2004 entitled "Diagnostic Device of Evaporated Fuel Processing System and the Method Thereof" and claiming JP 2003-304924 (copy previously submitted).

Copending U.S. Appl. No. 11/200,094 filed Aug. 10, 2005, entitled "Diagnostic Apparatus for Evaporative Emission Control System", and claiming 2004-234648 priority.

* cited by examiner

DIAGNOSTIC DEVICE OF EVAPORATED FUEL PROCESSING SYSTEM AND THE METHOD THEREOF

BACKGROUND OF THE INVENTION

The present invention relates to a diagnostic device and a diagnostic method of an evaporated fuel processing system, in particular, to a diagnosis of a leak in the evaporated fuel processing system including a fuel tank.

The present application claims priority from Japanese Patent Application No. 2003-304914, the disclosure of which is incorporated herein by reference.

In order to prevent the fuel evaporated in the fuel tank from being released to the atmosphere, an internal combustion engine including the evaporated fuel processing system is known. In this system, the evaporated fuel (evaporated gas) generated in the fuel tank is temporarily adsorbed by an adsorbent disposed in a canister. Then, the adsorbed evaporated fuel is released to an air intake system of the internal combustion engine through a purge passage under predetermined operating conditions. However, if a component of the system is broken or exploded for some reason, the evaporated fuel is released to the atmosphere. In order to prevent such a situation from taking place, a leak diagnosis for determining whether there is a leak in the evaporated fuel processing system or not is executed (for example, see Japanese Patent Application Laid-Open Nos. 2001-41116 and 2003-56417).

In the leak diagnosis, using an intake negative pressure, the negative pressure is first introduced in the evaporated fuel processing system. After changing the negative pressure into a target pressure value (a predetermined value of the negative pressure), the evaporated fuel processing system is closed. Alternatively, using a pump or the like, a positive pressure is introduced in the evaporated fuel processing system, and then after changing the positive pressure into a target pressure value (the predetermined value of the positive pressure), the evaporated fuel processing system is closed. Then, the amount of the evaporated fuel leak from the evaporated fuel processing system is estimated on the basis of a change amount (difference amount) between an internal pressure value of the evaporated fuel processing system at a timing of the closing and that at the timing after elapse of a predetermined time from the closing timing, and thus it is determined whether the leak exists or not.

A pressure state in the evaporated fuel processing system, however, does not stabilize yet immediately after the closing, and also it takes some time to stabilize the pressure state. More specifically, an overshoot occurs which is a phenomenon that the internal pressure in the evaporated fuel processing system continues to decrease more than the target pressure value with an elapse of time just after closing in the case of introducing the negative pressure, or that the internal pressure in the evaporated fuel processing system continues to increase more than the target pressure value with the elapse of time just after closing in the case of introducing the positive pressure.

Then, in the conventional leak diagnosis, an internal state of the evaporated fuel processing system is hold only in a constant period after the closing in view of the occurrence of the overshoot in advance, and namely after the internal pressure of the evaporated fuel processing system returns to the target pressure value, it starts to calculate the change amount of the internal pressure. In the conventional method, however, the calculation of the change amount can not be processed until the internal pressure returns to the target pressure value. As a result, there occurs an inconvenience that it takes too much time for diagnosing the leak.

SUMMARY OF THE INVENTION

The present invention was devised in view of the above situation and has an object of restraining a leak diagnosis of an evaporated fuel processing system from requiring a long time.

In order to solve the above problem, a first aspect of the present invention provides a diagnostic device of the evaporated fuel processing system, which closes the evaporated fuel processing system including a fuel tank after changing an internal pressure of the evaporated fuel processing system from a criterion pressure value to a target pressure value to execute a leak diagnosis of the evaporated fuel processing system. In the diagnostic device, an internal pressure detection section detects the internal pressure of the evaporated fuel processing system, whereas a diagnostic section executes the leak diagnosis of the evaporated fuel processing system based on a change amount between the respective internal pressure values at a start timing and at a termination timing for calculating a change in the pressure within the evaporated fuel processing system therebetween. The start timing is set on the basis of a timing when the internal pressure value detected by the detection section reaches a peak pressure value from the target pressure value after closing the evaporated fuel processing system, and the termination timing is set at a later timing than the start timing.

In the first aspect of the present invention, it is preferred that the diagnostic section variably sets the start timing in the period while the internal pressure value detected by the detection section returns from the peak pressure value to the target pressure value. Also, the diagnostic section sets the time period between the timing when the internal pressure value reaches the peak pressure value and the start timing based on internal conditions of the evaporated fuel processing system in a stage when the internal pressure of the evaporated fuel processing system is changed.

Further, in the first aspect of the present invention, the diagnostic section stops the leak diagnosis when the internal pressure value does not reach from the criterion pressure value to the target pressure value even if a predetermined time elapses. Also, the diagnostic section stops the leak diagnosis when the internal pressure value detected by the detection section does not reach from the target pressure value to the peak pressure value even if the predetermined time elapses.

A second aspect of the present invention provides a diagnostic method of an evaporated fuel processing system, which closes the evaporated fuel processing system including a fuel tank after changing an internal pressure of the evaporated fuel processing system from the criterion pressure value to the target pressure value, which is different from the criterion pressure value to execute the leak diagnosis of the evaporated fuel processing system. According to the diagnostic method, as a first step, the internal pressure of the evaporated fuel processing system is changed from the criterion pressure value to the target pressure value. As a second step, a start timing for calculating the change in the pressure within the evaporated fuel processing system is set. The start timing is set on the basis of the timing when the internal pressure value in the evaporated fuel processing system reaches from the target pressure value to the peak pressure value. As a third step, the leak diagnosis of the evaporated fuel processing system is executed on the basis of the change amount between the internal pressure value at the set start timing and the internal pressure value at the termination timing which is set after the start timing.

In the second aspect of the present invention, it is preferred that the second step variably sets the start timing in a period while the internal pressure value returns from the peak pressure value to the target pressure value. Also, the second step sets a time period between the timing when the internal pressure value reaches the peak pressure value and the start timing based on internal conditions of the evaporated fuel processing system in the stage when the internal pressure of the evaporated fuel processing system is changed.

Further, in the second aspect of the present invention, it is preferred that the leak diagnosis is stopped when the internal pressure value does not reach from the target pressure value to the peak pressure value even if the predetermined time elapses.

According to the present invention, the start timing for calculating the change amount of the internal pressure value is set on the basis of the timing when the internal pressure reaches the peak pressure value, so that the start timing can be set at an adequate timing. At the same time, since the calculation of the change amount can be started before the internal pressure returns the target pressure value, a diagnosing time period can be shortened.

BRIEF DESCRIPTION OF THE DRAWINGS

These and other objects and advantages of the present invention will be understood from following descriptions with reference to accompanying drawings, wherein.

DETAILED DESCRIPTION OF THE PREFERRED EMBODIMENTS

Figure 1:
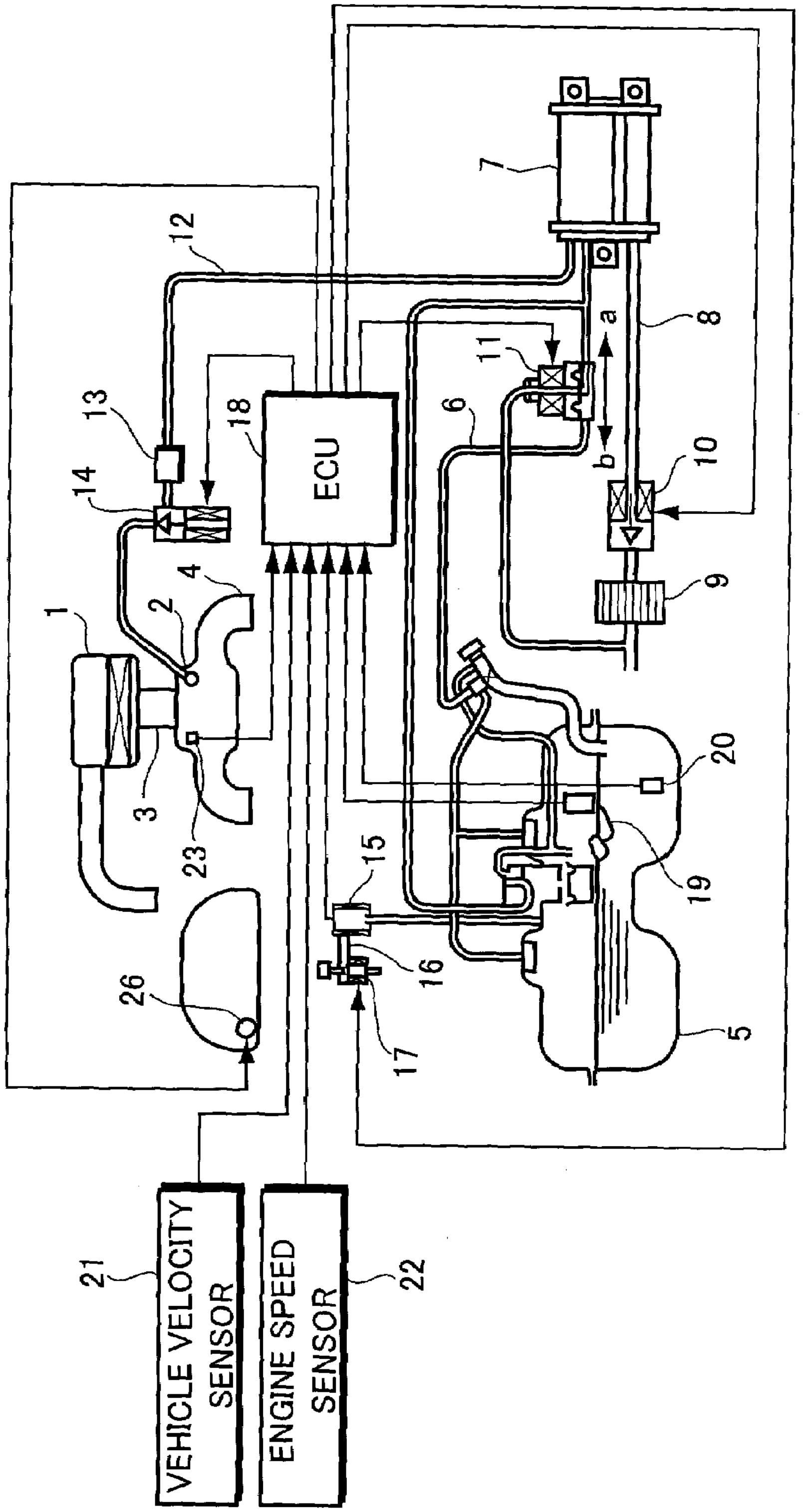
FIG. 1 is a block diagram showing a diagnostic device of an evaporated fuel processing system according to the present invention.

FIG. 1 is a block diagram of a diagnostic device of an evaporated fuel processing system according to the present invention. An airflow amount is controlled in accordance with the opening degree of an electric throttle valve (not shown), and dusts and the like in the atmosphere are removed by an air cleaner 1. The throttle valve in a throttle body 3 is provided in an intake passage provided between the air cleaner 1 and an air chamber 2. The opening degree of the throttle valve is set by an electric motor. The opening degree is set by an output signal from a control device 18 (hereinafter, referred to as "ECU") composed mainly of a microcomputer. The intake air of which amount of flow is controlled by the throttle opening degree flows through the air chamber 2 and an intake manifold 4 to be mixed with a fuel (a gasoline) injected from injectors (not shown). Each of injectors is arranged so that its tip projects into the intake manifold 4 and is provided for each cylinder of an engine. The fuel of which pressure is regulated is supplied to each of the injectors through a fuel pipe (not shown) in communication with a fuel tank 5. An air-fuel mixture formed within the intake manifold 4 flows into a combustion chamber of the engine by opening an intake valve. The air-fuel mixture is ignited by an ignition plug so as to combust the air-fuel mixture. As a result, a driving force of the engine is generated. The gas generated by the combustion is exhausted from the combustion chamber to an exhaust passage by opening an exhaust valve.

An evaporated fuel generated in the fuel tank 5 is released through the evaporated fuel processing system to the air chamber 2. More specifically, the fuel tank 5 is in communication with a canister 7 through an evaporated fuel passage 6 provided at the top of the fuel tank 5. The evaporated fuel in the fuel tank 5 is adsorbed by an adsorbent such as activated carbon filled within the canister 7. After a gas in the canister 7, which does not contain any fuel components (in particular, hydrocarbon (HC) and the like), passes through a new air introduction passage 8 to be purified by a drain filter 9, the gas is released to the atmosphere. An opening and closing of a drain valve 10 is controlled by the ECU 18. In a normal control of the drain valve 10, an electromagnetic solenoid is switched OFF, so that the valve 10 is set to be in an open state. On the other hand, in a leak diagnosis, the electromagnetic solenoid is switched ON in accordance with a control signal from the ECU 18, so that the drain valve 10 is set to be in a close state.

A pressure control solenoid valve 11 (hereinafter, referred to as "PCV") having a mechanical pressure regulating mechanism is inserted in the evaporated fuel passage 6 so as to regulate an internal pressure of the fuel tank 5. The PCV 11 mechanically opens and closes in accordance with the pressure difference between the internal pressure of the fuel tank 5 and the atmospheric pressure or in accordance with a pressure difference between the internal pressure of the fuel tank 5 and the internal pressure of the canister 7 in a normal control state where an electromagnetic solenoid is switched OFF. More specifically, if the internal pressure of the fuel tank 5 becomes higher than the atmospheric pressure, the PCV 11 opens so that the evaporated fuel in the fuel tank 5 flows toward the canister 7 (in a direction from b to a in the evaporated fuel passage 6 in FIG. 1). As a result, the pressure state in the fuel tank 5 is regulated to be the atmospheric pressure so as to restrain the internal pressure of the fuel tank 5 from increasing. On the other hand, if the internal pressure in the fuel tank 5 becomes lower than the internal pressure of the canister 7, that is, if the internal pressure of the fuel tank 5 becomes negative, the PCV 11 also opens so that the gas in the canister 7 flows toward the fuel tank 5 (in a direction from a to b in the evaporated fuel passage 6 in FIG. 1). As a result, since the pressure state in the fuel tank 5 is regulated to the atmospheric pressure, the internal pressure of the fuel tank 5 is restrained from lowering. Owing to such a mechanical pressure regulating mechanism, the fuel tank 5 can be effectively prevented from being deformed or broken. On the other hand, in the leak diagnosis, the electromagnetic solenoid is switched ON in accordance with a control signal of the ECU 18 so that the PCV 11 is forced to open. In the open valve state, the gas flows from any one of the directions, that is, from the fuel tank 5 to the canister 7 or from the canister 7 to the fuel tank 5 in accordance with the pressure difference between both the internal pressures of the fuel tank 5 and the canister 7.

On the other hand, a chamber 13 is formed in a purge passage 12 communicating between the canister 7 and the air chamber 2 of the air intake system. In its downstream, a purge control solenoid valve 14 (hereinafter, referred to as "purge valve") is inserted. The purge valve 14 is a duty solenoid valve of which opening degree is set in accordance with a duty ratio of the control signal output from the ECU 18. In the leak diagnosis, the opening degree of the purge valve 14 is regulated in accordance with diagnostic conditions. On the other hand, in the normal control of the valve, the opening degree of the purge valve 14 is controlled in accordance with operating states of a vehicle, thereby controlling a purge amount. The chamber 13 in the upstream side of the purge valve 14 is provided so as to eliminate an airflow noise or a pulsation noise generated by the opening/closing operations of the purge valve 14.

A pressure sensor 15 for detecting the internal pressure of the fuel tank 5 is arranged above the fuel tank 5. The pressure sensor 15 detects the pressure difference between the atmospheric pressure and the internal pressure of the fuel tank 5 as an internal pressure, and outputs the internal pressure as an internal pressure value $P_{tank}$ to the ECU 18. In an atmosphere introducing passage 16 for introducing the atmosphere to the pressure sensor 15, a tank internal pressure switching solenoid valve 17 (hereinafter, referred to as "tank internal pressure valve") of which opening/closing is controlled by the ECU 18 is provided. The reason why the valve 17 is provided is as follows. If the atmospheric pressure varies with an altitude change occurring while the vehicle is running, the internal pressure value $P_{tank}$ varies even when an absolute pressure in the fuel tank 5 is constant. Therefore, the valve 17 is provided so as to cope with such a variation. In the normal operation, the electromagnetic solenoid is switched OFF so as to set the tank internal pressure valve 17 in an open state. As a result, the atmosphere introducing passage 16 is open to the atmosphere. On the other hand, the electromagnetic solenoid is switched ON in response to a control signal from the ECU 18 so as to set the tank internal pressure valve 17 in a close state in the leak diagnosis. As a result, the pressure state in the atmosphere introducing passage 16 between the pressure sensor 15 and the tank internal pressure valve 17 is regulated to be the atmospheric pressure.

The ECU 18 performs calculations for the injected fuel amount from the injectors, an injection timing thereof, an ignition timing, the throttle opening degree, and the like in accordance with a control program stored in a ROM. The ECU 18 outputs the control amount (a control signal) calculated by the above calculations to various actuators. The ECU 18 also executes the leak diagnosis for the above-described evaporated fuel processing system including the fuel tank 5. As information necessary for the ECU 18 to execute the leak diagnosis, detection signals from the pressure sensor 15 and various sensors 19 to 23, and the like are given. The fuel level sensor 19 is attached within the fuel tank 5 so as to detect a level L of the remaining fuel amount. A fuel temperature sensor 20 detects a fuel temperature T. A vehicle velocity sensor 21 detects a vehicle velocity V. An engine speed sensor 22 detects the engine speed Ne. An intake pressure sensor 23 detects an intake negative pressure on the downstream of the throttle valve, and outputs the detected intake negative pressure as an intake negative pressure value $P_{in}$ to the ECU 18.

Figure 2:
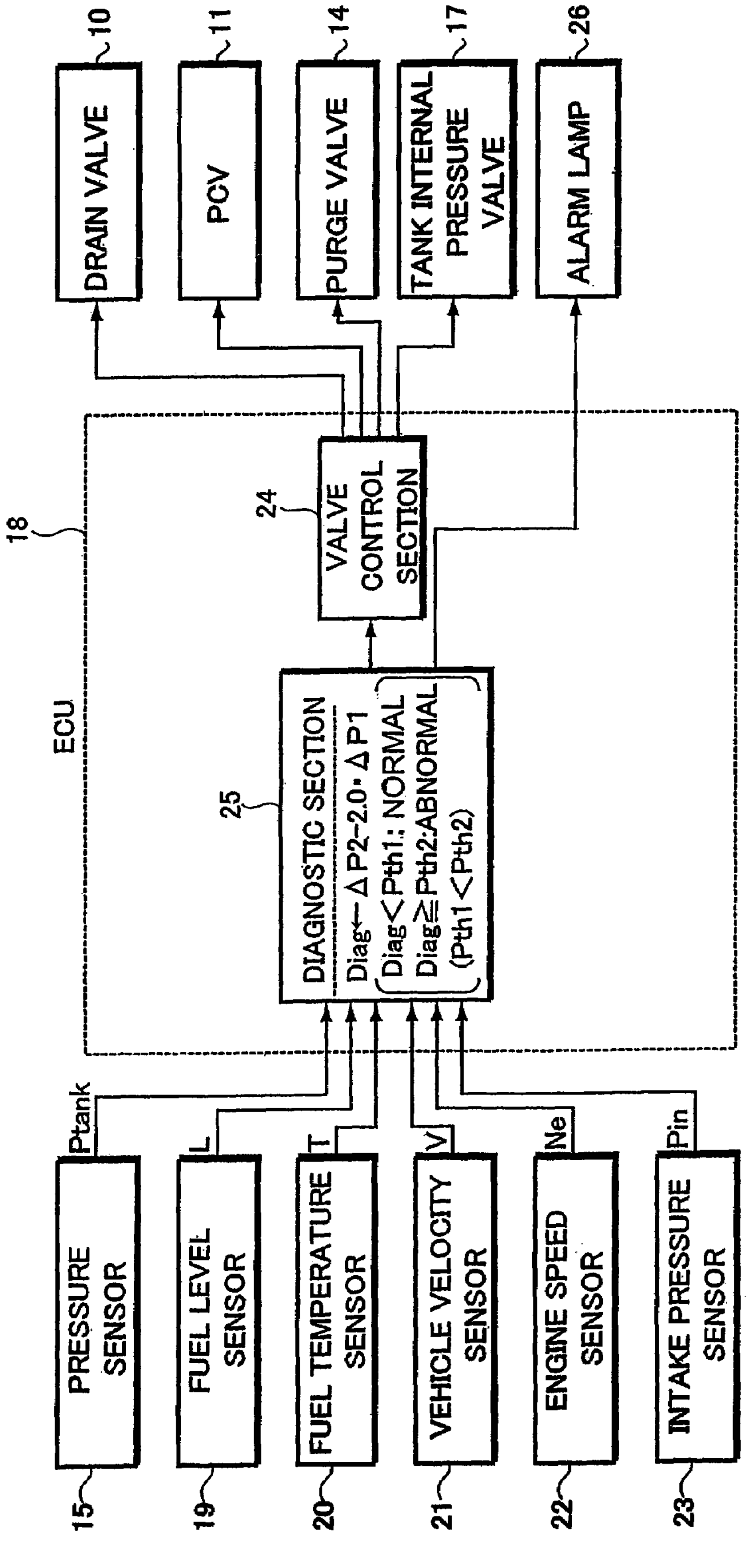
FIG. 2 is a functional block diagram of an ECU.

FIG. 2 is a functional block diagram of the ECU 18. When the ECU 18 for executing the leak diagnosis is examined in view of its functionality, the ECU 18 has a valve control section 24 and a diagnostic section 25. The valve control section 24 outputs a control signal for indicating an open/close state of each of the valves 10, 11, and 17 in accordance with conditions of the leak diagnosis in the diagnostic section 25. The control signals switch the electromagnetic solenoid ON/OFF so as to set an open/close state of the corresponding valves 10, 11, and 17. The valve control section 24 outputs the control signal to the purge valve 14 so as to set the opening degree of the purge valve 14 in accordance with a duty ratio of the control signal. In order to execute the leak diagnosis in the evaporated fuel processing system including the fuel tank 5, the diagnostic section 25 closes the evaporated fuel processing system after the internal pressure in the processing system is changed from a criterion pressure value (atmospheric pressure value in the present embodiment) to a target pressure value $P_{trg}$ (predetermined value of negative pressure in the present embodiment). More specifically, a start timing for calculating the pressure change is set on the basis of a timing when the internal pressure value $P_{tank}$ detected by the pressure sensor 15, i.e., internal pressure in the evaporated fuel processing system in communication with the fuel tank 5, reaches from the target negative pressure value $P_{trg}$ to a peak pressure value $P_{tpeak}$. Then, the leak diagnosis is executed on the basis of the change amount between the internal pressure value $P_{tank}$ detected by the pressure sensor 15 at the start timing and the internal pressure value $P_{tank}$ detected by the pressure sensor 15 at a termination timing which is set so as to come after the start timing. The diagnostic section 25 gives a result of diagnosis "abnormal" if the leak occurrence in the evaporated fuel processing system is determined, whereas it gives a result of diagnosis "normal" if the absence of the leak is determined.

Figure 3:
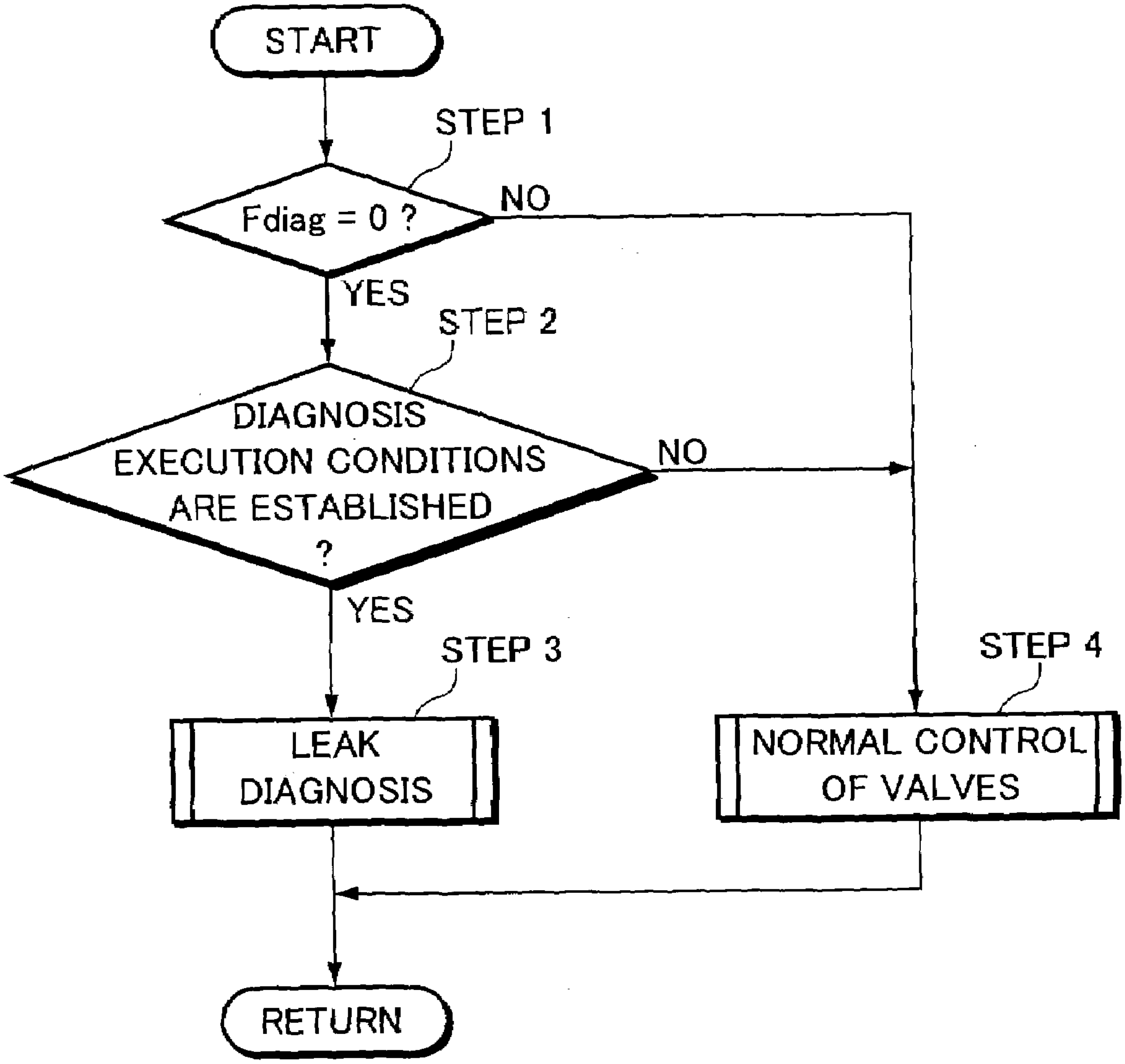
FIG. 3 is a flowchart of a leak diagnosis routine according to the present invention.

FIG. 3 is a flowchart of a leak diagnosis routine according to the present embodiment. The routine is read out at predetermined intervals (for example, 10 ms) so as to be executed by the ECU 18 between a start and a stop of the engine, that is, in one operating cycle. A leak diagnosis target in the present embodiment is the evaporated fuel processing system including the fuel tank 5 (the evaporated fuel passage 6, the canister 7, the purge passage 12 communicating between the purge valve 14 and the canister 7, and the like).

First, at step 1, it is determined whether a diagnosis execution flag $F_{diag}$ is "0" or not. The diagnosis execution flag $F_{diag}$ is initially set to "0". When the leak diagnosis is properly completed, that is, the result of diagnosis of "normal" or "abnormal" is obtained within one operating cycle, the diagnosis execution flag $F_{diag}$ is set to "1". Therefore, once the diagnosis execution flag $F_{diag}$ is changed from "0" to "1" at a certain timing, a leak diagnosis at step 3 is skipped so that the process proceeds to step 4 in accordance with the determination at step S1 as long as the operating cycle continues after that. In this case, as described below, the ECU 18 exits from the routine after the normal control execution of the valves. On the other hand, if it is determined to be "YES" at step 1, that is, the leak diagnosis is not completed yet, the process proceeds to step 2.

At the step 2, it is determined whether diagnosis execution conditions are established or not. The diagnosis execution conditions define an operating state suitable for the leak diagnosis. In order to avoid the diagnosis execution in an inappropriate operating state, the determination at step 2 is executed prior to the leak diagnosis at step 3. As the diagnosis execution conditions, for example, the following conditions (1) to (4) can be given.

Diagnosis Execution Conditions (1) A predetermined time period or more elapses after the engine start (for example, 325 sec).

Immediately after the engine start, the engine speed is not stabilized yet to destabilize the internal pressure value $P_{tank}$. As a result, there arises a possibility of erroneous determination in the leak diagnosis. Therefore, if the time period elapsing after the engine start is short, it is determined that the engine speed is not stabilized not to permit the execution of the leak diagnosis.

(2) The fuel temperature T is within the range of a predetermined temperature (for example, $-10 \leqq T \leqq 35°$ C.).

If the fuel temperature T is high, the generated evaporated fuel amount becomes large. As a result, it becomes difficult to determine whether there is the leak in the evaporated fuel processing system including the fuel tank 5 or not. Therefore, the fuel temperature T is detected by using the fuel temperature sensor 20. If the fuel temperature T does not fall within an appropriately set range, the execution of the leak diagnosis is not permitted.

(3) Fuel shake in the fuel tank is small.

Under the condition where the fuel in the fuel tank 5 is widely shaken, the pressure in the fuel tank 5 largely varies. As a result, there arises a possibility of erroneous determinations in the leak diagnosis. Thus, the fuel shake in the fuel tank 5 is specified by using the fuel level sensor 19. The fuel shake can be estimated from the change amount $\Delta L$ detected by the fuel level sensor 19 per set time. More specifically, if the change amount $\Delta L$ is larger than the appropriately set criterion value, it is determined that the fuel shake is large not to permit the execution of the leak diagnosis.

(4) The engine speed Ne and the vehicle velocity v are respectively equal to or larger than the predetermined values ($Ne \geqq 1500$ rpm, $v \geqq 70$ km/h).

When the vehicle runs at low speed, its running condition is unstable. Therefore, there arises a possibility of erroneous determination in the leak diagnosis. Accordingly, the leak diagnosis is executed when the vehicle runs at high speed at which the running condition is relatively stable.

If it is determined to be "NO" at step 2, that is, if the diagnosis execution conditions are not all established, the leak diagnosis at step 3 is skipped so that the process proceeds to step 4. At step 4, the process exits from the routine after execution of normal control of the valves described below.

Normal Control of Valves

| | |
|---|---|
| Drain valve 10 | opened |
| PCV 11 | opened/closed by a mechanical mechanism |
| Purge valve 14 | opened/closed in accordance with the operating condition |
| Tank internal pressure valve 17 | opened |

On the other hand, if it is determined to be "YES" at step 2, that is, if all the diagnosis execution conditions are established, the process proceeds to step 3.

Figure 4:
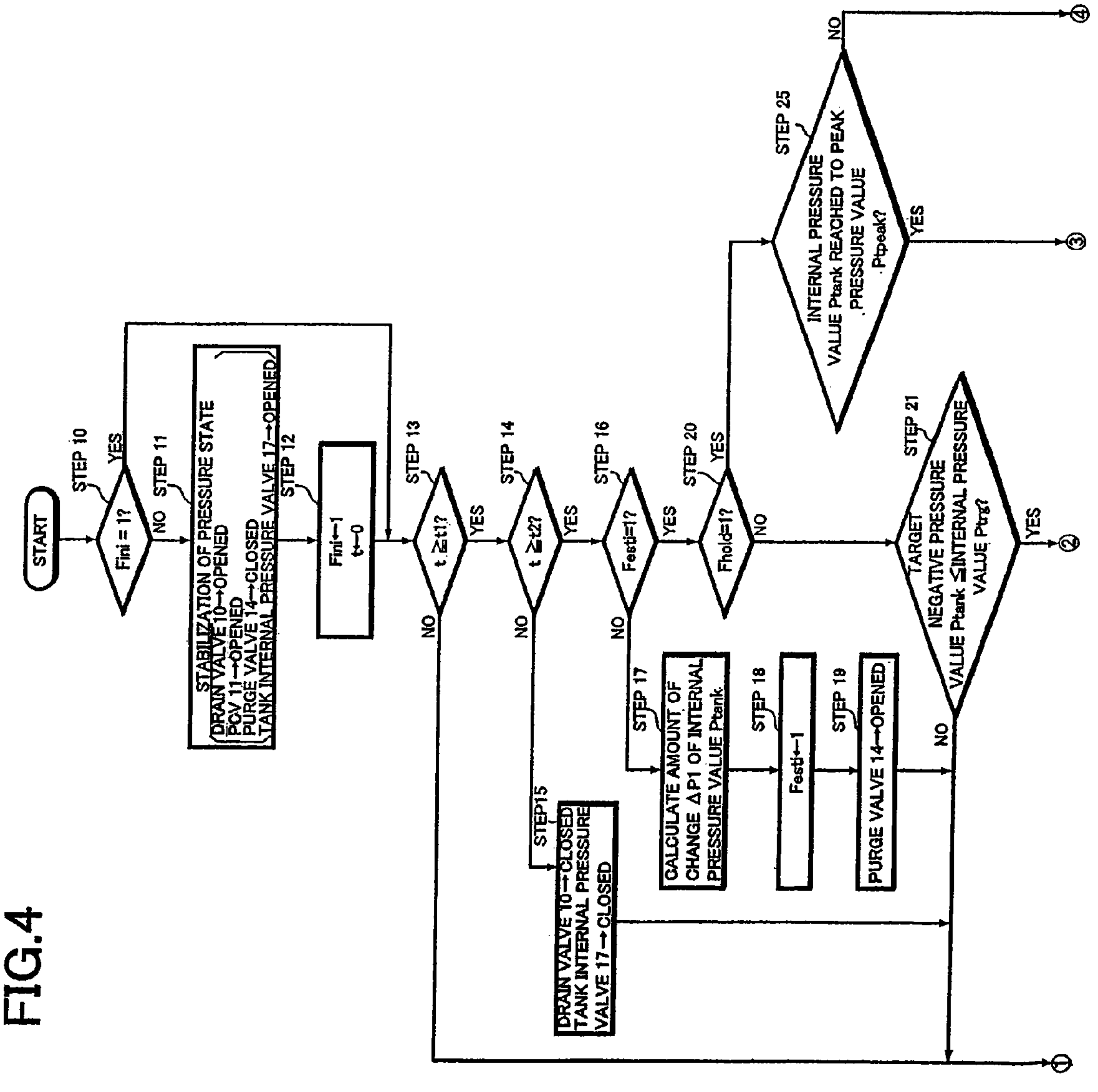
FIG. 4 is a flowchart showing the details of the leak diagnosis routine at step 3 in FIG. 3.
Figure 5:
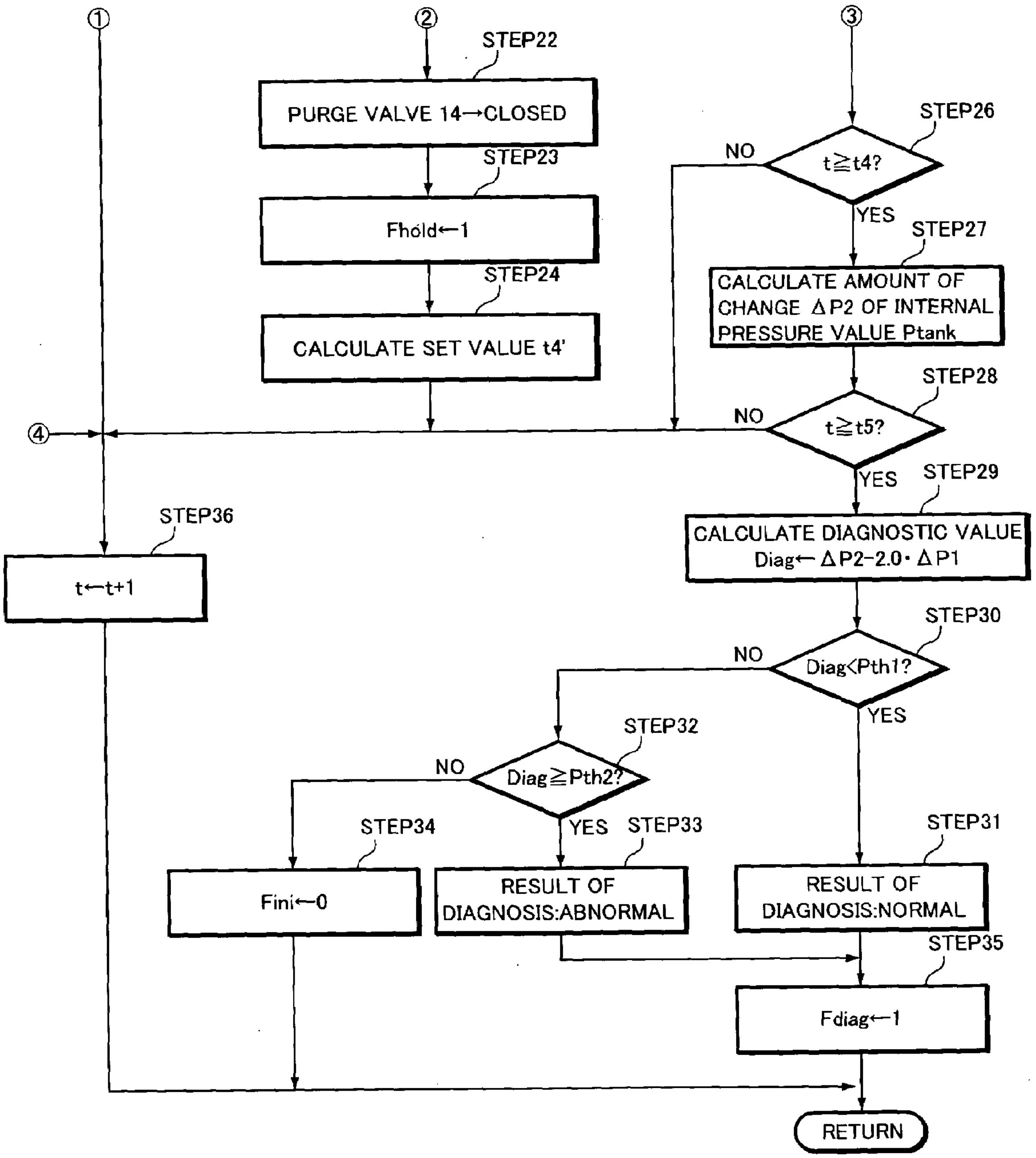
FIG. 5 is a flowchart subsequent to that of FIG. 4.
Figure 6:
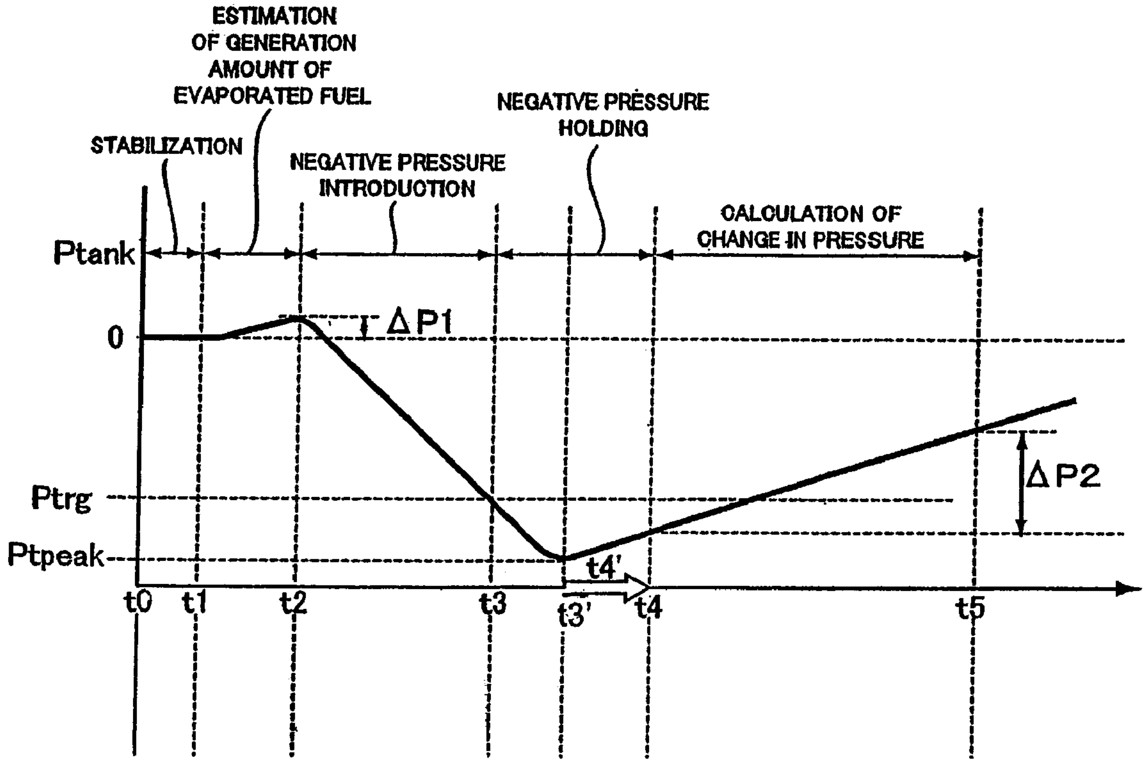
FIG. 6 is a timing chart in a leak diagnosis.

FIGS. 4 and 5 are flowcharts showing the details of the leak diagnosis routine at step 3. FIG. 6 is a timing chart in the leak diagnosis. The leak diagnosis at step 3 proceeds in principle in the order of: stabilization of the pressure state in the evaporated fuel processing system (a time period from t0 to t1); estimation of the amount of evaporated fuel generated (a time period from t1 to t2); introduction of a negative pressure to the evaporated fuel processing system (a time period from t2 to t3); negative pressure holding (a time period from t3 to t4); and calculation of a pressure change (a time period from t4 to t5).

First, at step 10, it is determined if an initial determination flag $F_{ini}$ is "1" or not. The initial determination flag $F_{ini}$ is set to "0" in the following three cases:

(Case 1) In a first execution of this routine in the operating cycle;

(Case 2) In the execution of this routine immediately after it is determined to be "NO" at step 2; and (Case 3) In the execution of this routine immediately after the initial determination flag $F_{ini}$ is reset to "0" at step 34.

In the leak diagnosis, an open/close state of each of various valves 10, 11, 14, and 17 is set so that the atmospheric pressure as the internal pressure in the evaporated fuel processing system including the fuel tank 5 is changed to a target negative pressure value $P_{trg}$. Then, by monitoring the change in the internal pressure value $P_{tank}$ detected by the pressure sensor 15, the leak diagnosis of the system is executed. Therefore, in order to monitor the internal pressure value $P_{tank}$, there arises the necessity of resetting the internal pressure of the evaporated fuel processing system to the atmospheric pressure in the first execution of the diagnostic cycle (Case 1) or the re-execution of the diagnostic cycle (Case 2 or 3). Therefore, if the initial determination flag $F_{ini}$ is "0," the process proceeds to step 11 in accordance with the negative result of the determination at step 10. On the other hand, if the initial determination flag $F_{ini}$ is "1", namely, in the case where the leak diagnosis is continuous from the previous routine, steps 11 and 12 are skipped so that the process proceeds to step 13.

At step 11, the pressure state in the evaporated fuel processing system is stabilized, that is, the pressure state is reset. More specifically, the purge valve 14 is closed so as to force the PCV 11 to open and to open the drain valve 10. As a result, the pressure state in the evaporated fuel processing system is regulated to the same pressure state as that of the atmospheric pressure. At the same time, the tank internal pressure valve 17 is opened. Then, at step 12, the initial determination flag $F_{ini}$ is set to "1", whereas a count value t of a diagnostic counter is reset to "0".

At step 13, it is determined whether the count value t of the diagnostic counter reaches a termination timing t1 within the stabilization period from t0 to t1 of the pressure state in the evaporated fuel processing system or not. If it is determined to be "NO" at step 13, that is, if the count value t does not reach the termination timing t1 ($t \leqq t1$), the process after step 14 is skipped so that the process proceeds to step 36 in FIG. 5. In this case, after the count value t is incremented (step 36), the process exits from the routine. On the other hand, if the diagnosis cycle continues so that the count value t reaches the termination timing t1 ($t \geqq t1$), the process proceeds to step 14 in accordance with the positive result of determination at step 13 as long as the diagnostic cycle continues after that.

At step 14, it is determined whether the count value t of the diagnostic counter reaches the termination timing t2 in the estimation time period from t1 to t2 of the amount of the generated evaporated fuel or not. If it is determined to be "NO" at step 14, that is, if the count value t does not reach the termination timing t2 ($t1 \leqq t < t2$), the process proceeds to step 15, skipping the process after step 16. At step 15, the drain valve 10 is closed, while the pressure valve 17 is also closed. The drain valve 10 is closed so that the evaporated fuel processing system is closed after the internal pressure thereof is regulated to the atmospheric pressure at the timing t1. Then, at step 36 following step 15, after the count value t of the diagnosis counter is incremented, the process exits from the routine.

On the other hand, the diagnostic cycle continues so that the count value t reaches the termination timing t2 in the estimation time period ($t \geqq t2$), and then the process proceeds to step 16 in accordance with the positive result of determination at step 14 as long as the diagnostic cycle continues after that. At the step 16, it is determined whether an evaporated fuel amount estimation flag $F_{esti}$ is "1" or not. The flag $F_{esti}$ is initially set to "0". In the case where the amount of the evaporated fuel is estimated, the flag $F_{esti}$ is set to "1". Therefore, in this diagnostic cycle, if the generated evaporated fuel amount is not estimated (the negative result of the determination at step 16), the process proceeds to step 17. On the other hand, once the evaporated fuel amount estimation flag $F_{esti}$ is changed from "0" to "1", the process proceeds to step 20 in accordance with the positive result at step 16 as long as the diagnostic cycle continues after that.

At step 17, the change amount ΔP1 of the internal pressure value $P_{tank}$ is calculated. As described above, by closing the tank internal pressure valve 17, the atmosphere introducing passage 16 in communication with the pressure sensor 15 is substantially held to the atmospheric pressure at the timing t1 at which the valve 17 is closed. Therefore, the change amount ΔP1 of the internal pressure value $P_{tank}$ depends on the amount of evaporated fuel generated in the fuel tank 5 without being affected by a variation in the atmospheric pressure. The internal pressure value $P_{tank}$ is gradually increased with elapse of time as the generated evaporated fuel amount increases. Therefore, the change amount ΔP1 corresponding to the difference between the internal pressure value $P_{tank}$ at the timing t1 and the internal pressure value $P_{tank}$ at the current timing t2 can be regarded as the evaporated fuel amount generated. As described below, the change amount ΔP1 is used as a correction value for estimating the leak amount.

After the evaporated fuel amount estimation flag $F_{esti}$ is set to "1" at step 18, the purge valve 14 is opened at step 19. Since the purge valve 14, which has been closed until then, is opened at step 19, a negative pressure is introduced from the air intake system to the evaporated fuel processing system after the timing t2. As a result, the internal pressure value $P_{tank}$ of the fuel tank 5 in communication with the evaporated fuel processing system suddenly decreases. Then, at step 36 following step 19, the process exits from the routine after the count value t is incremented.

At step 20, it is determined whether the negative pressure holding flag $F_{hold}$ is "1" or not. The negative pressure holding flag $F_{hold}$ is initially set to "0". After a completion of the negative pressure introduction to the evaporated fuel processing system, the negative pressure holding flag $F_{hold}$ is set to "1". Therefore, the process proceeds to step 21 in accordance with the negative result of determination at step 20 as long as the negative pressure holding flag $F_{hold}$ is "0". On the other hand, when the negative pressure holding flag $F_{hold}$ is changed from "0" to "1", the process proceeds to step 25 in accordance with the positive result of the determination at step 20 as long as the diagnostic cycle continues after that.

At step 21, it is determined whether the internal pressure value $P_{tank}$ reaches the target negative pressure value $P_{trg}$ or not. Since the purge valve 14 is opened at step 19 described above, the internal pressure valve $P_{tank}$ decreases to be closer to the target negative pressure value $P_{trg}$, that is, the negative pressure in the evaporated fuel processing system becomes deeper as the diagnostic cycle continues. If it is determined to be "NO" at step 21, that is, if the internal pressure value $P_{tank}$ is larger than the target negative pressure value $P_{trg}$ ($P_{tank}>P_{trg}$), the process exits from the routine after the count value t is incremented at step 37. On the other hand, if the diagnostic cycle continues so that the internal pressure value $P_{tank}$ reaches the target negative pressure value $P_{trg}$ ($P_{tank}<P_{trg}$), the process proceeds to step 22 in accordance with the positive result of the determination at step 21.

At step 22 shown in FIG. 5, the purge valve 14 is closed in order to terminate the introduction of the negative pressure to the evaporated fuel processing system. By closing the purge valve 14, the evaporated fuel processing system is closed after the internal pressure of the evaporated fuel processing system is changed to the target negative pressure value $P_{trg}$ at the closing timing t3. As a result, the negative pressure holding flag $F_{hold}$ is set to "1" at step 23.

At step 24 following step 23, a set value t4' defining the termination timing t4 of the negative pressure holding period, that is, a start timing of the time period t4–t5 for the pressure change calculation, is calculated. The reason why the set value t4' is calculated is for shortening the diagnosis time owing to shifting from the negative pressure holding period to the pressure change calculation period at an adequate timing.

The internal pressure value $P_{tank}$ after the closing timing t3 is supposed to change in a direction of the increase thereof because of the leak in the evaporated fuel processing system or an occurrence of the evaporated fuel, but actually, the value changes in a direction of the decrease by the inducing effect of the negative pressure. More exactly, as the pressure state within the evaporated fuel processing system is stabilized, the internal pressure value $P_{tank}$ reaches a peak pressure value $P_{tpeak}$, which is a minimum value in the present embodiment, and then returns the target negative pressure value $P_{trg}$, that is, the foregoing overshoot occurs at this stage. Therefore, in the conventional leak diagnosis method, the negative pressure holding period is terminated after the internal pressure value $P_{tank}$ returns from the target negative pressure value $P_{trg}$ at the closing timing t3 to the value $P_{trg}$ again in view of the occurrence of the overshoot. In other words, the conventional method estimates the leak amount of the evaporated fuel processing system in an internal pressure change range without an effect of the overshoot so as to improve an accuracy of the estimation.

In order to eliminate the problem of the overshoot to estimate the leak amount, however, it should be noted that the start timing t4 for calculating the pressure change just may not be set in the period while the internal pressure value $P_{tank}$ reaches from the target negative pressure value $P_{trg}$ to the peak pressure value $P_{tpeak}$. In other words, as the earliest timing, the start timing t4 may be set at the timing when the internal pressure value $P_{tank}$ reaches the peak pressure value $P_{tpeak}$. In this way, the pressure change calculation period can start before the timing when the internal pressure value $P_{tank}$ returns to the target negative pressure value $P_{trg}$ As a result, the diagnosis time can be more suppressed from lengthening than that of the conventional leak diagnosis method.

Even on the way where the internal pressure returns from the peak pressure value $P_{tpeak}$ to the target negative pressure $P_{trg}$, however, there may occur an inadequate pressure variation in the internal pressure value $P_{tank}$ within some time period after the peak pressure value $P_{tpeak}$ is reached. That is, there may occur, for example, a non-linear or non-successive change in the internal pressure value. Therefore, in the case that the start timing t4 is fixedly set to the timing when the peak pressure value $P_{tpeak}$ is reached, an accuracy of the estimation about the leak amount may be lowered.

In the present embodiment, the set value t4' is calculated on the basis of the internal conditions of the evaporated fuel processing system in view of an experience that the length of the above-mentioned inadequate pressure variation period changes in dependency on the internal conditions of the evaporated fuel processing system at the time when the negative pressure is introduced The set value t4' is specifically calculated from a calculation formula or map in which the corresponding relationship between parameters showing the internal conditions of the evaporated fuel processing system and the set value t4' is adequately set through a simulation or an experiment performed in advance. More specifically, the set value t4 is 0 sec at the minimum, and a time period required for returning from the peak pressure value $P_{tpeak}$ to the target negative pressure value $P_{trg}$ at the maximum, that is, is variably set within this range. As a result, the set value t4' is set on the basis of the timing when the internal pressure value $P_{tank}$ reaches the peak pressure value $P_{tpeak}$ within the time period when the improper effect of the foregoing inadequate pressure variation can be avoided.

As condition parameters for calculating the set value t4', the negative pressure introducing time (t2–t3), an intake negative pressure value $P_{in}$ while introducing the negative pressure, and the like are given. For example, the set value t4' is set as 2 second in the case that the negative pressure introducing time is 10 second, and the intake negative pressure value $P_{in}$ is 500 mmHg (≈66.7 kPa). Also, the set value t4' is set as 5 second in the case that the negative pressure introducing time is 15 second, and the intake negative pressure value $P_{in}$ is 300 mmHg (≈40.0 kPa). The calculation formula or map is stored in a series of addresses in ROM of ECU 18. At step 36 following step 24, the count value t is incremented, and then the process exits from this routine.

Returning to step 25 in FIG. 4, it is determined whether the internal pressure value $P_{tank}$ reaches the peak pressure value $P_{tpeak}$ or not. The peak pressure value $P_{tpeak}$ can be specified through comparing the respective values between the internal pressure value $P_{tank(n-1)}$ in the previous routine and the current internal pressure value $P_{tank(n)}$. More specifically, when the internal pressure value $P_{tank}$ reaches the peak pressure value $P_{tpeak}$, a positive/negative sign of a difference value ($P_{tank(n)}-P_{tank(n-1)}$) between the current internal pressure value $P_{tank(n)}$ and the previous internal pressure value $P_{tank(n-1)}$ is inverted. In the present embodiment, it is changed from any negative value to zero or any positive value. Therefore, the previous internal pressure value $P_{tank(n-1)}$ at the timing when the foregoing positive/negative sign is inverted becomes the peak pressure value $P_{tpeak}$, the timing of which is shown as t3' in FIG. 6.

At step 25, if it is determined to be "NO", that is, if the internal pressure value $P_{tank}$ does not reach the peak pressure value $P_{tpeak}$ yet, the count value t is incremented at step 36, and then the process exits from the routine. On the other hand, if it is determined to be "YES" at step 25, that is, if the internal pressure value $P_{tank}$ reaches the peak pressure value $P_{tpeak}$ through the continuation of diagnostic cycle, the process proceeds to step 26.

At step 26, it is determined whether the count value t of the diagnostic counter reaches a termination timing t4 within the negative pressure holding period t3–t4 or not. The termination timing t4 is calculated through adding the calculated set value t4' to the timing t3' at the peak pressure value $P_{tpeak}$. At step 26, if it is determined to be "NO", that is, if the count t does not reach the termination timing t4 yet, the count t is incremented at step 36, and then the process exits from the routine. On the other hand, if the count t reaches the termination timing t4 owing to the continuation of the diagnostic cycle, the process proceeds to step 27 as long as the operating cycle continues.

At step 27, the change amount ΔP2 of the internal pressure value $P_{tank}$ is calculated. As described above, the timing t4 as the start timing for calculating the change amount in pressure is determined by adding the set value t4' to the timing t3' as the peak pressure value $P_{tpeak}$. In the internal pressure value $P_{tank}$ after the start timing t4, the change amount ΔP2 depends on the amount of evaporated fuel generated in the fuel tank 5 and the leak amount caused in the evaporated fuel processing system. The change amount ΔP2 can be specified by calculating the difference between the internal pressure value $P_{tank}$ at the timing t4 and the internal pressure value $P_{tank}$ at the current timing t.

At step 28, it is determined whether the count value t of the diagnostic counter reaches the termination timing t5 within a pressure change calculation period from t4 to t5 or not. If it is determined to be "NO" at step 28, that is, if the count value t does not reach the termination timing t5, the process after step 29 is skipped. Then, after the count value t is incremented (step 36), the process exits from the routine. On the other hand, if the count value t reaches the termination timing t5, the process proceeds to step 29 in accordance with the positive result of determination at step 28.

At step 29, a diagnostic value $D_{iag}$ is estimated on the basis of a difference between the two calculated amounts of change ΔP1 and ΔP2. The change amount ΔP2 corresponds to the change amount in the internal pressure value $P_{tank}$ within the time period from t4 to t5 and is affected not only by the leak in the evaporated fuel processing system but also by the generated evaporated fuel. Therefore, a value obtained by multiplying the change amount ΔP1 specifically due to the generation of evaporated fuel by a weighting coefficient k (a value of k is determined by the capacity of the fuel tank and the like (for example, 2.0)) is subtracted from the change amount ΔP2. As a result, the pressure change amount corresponding to the leak amount in the evaporated fuel processing system can be obtained as the diagnostic value $D_{iag}$. The diagnostic value $D_{iag}$ means that the leak amount in the evaporated fuel processing system is larger as the diagnostic value $D_{iag}$ is larger.

At step 30, it is determined whether the diagnostic value $D_{iag}$ is smaller than a first criterion threshold value $P_{th1}$ (for example, 600 pa) or not. If the diagnostic value $D_{iag}$ is smaller than the threshold value $P_{th1}$, that is, if the leak amount is small, the result of diagnosis "normal" is given (step 31). On the other hand, the diagnostic value $D_{iag}$ is equal to or larger than the threshold value $P_{th1}$, the process proceeds to step 32.

At step 32, it is determined whether the diagnostic value $D_{iag}$ is equal to or larger than a second criterion threshold value $P_{th2}$ (for example, 800 pa) or not. If the diagnostic value $D_{iag}$ is equal to or larger than the threshold value $P_{th2}$, that is, if the leak amount is large, the result of diagnosis "abnormal" is given (step 33). On the other hand, if the diagnostic value $D_{iag}$ is smaller than the threshold value $P_{th2}$ and equal to or larger than the threshold value $P_{th1}$, it is determined neither as "normal" nor as "abnormal". In this case, after the initial determination flag $F_{in}$ is reset to "0" in order to re-execute the diagnostic cycle (step 34), the process exits from the routine.

Then, at step 35 following step 31 or 33, the diagnosis execution flag $F_{diag}$ is changed from "0" to "1" so that the process exits from the routine. Although not described in details, the result of the leak diagnosis is reflected in a leak NG flag stored in a backup RAM of the ECU 18 (for example, normal when the leak NG flag=0 is established, and abnormal when the leak NG flag is 1). Then, a portable failure diagnostic device (serial monitor) is connected to an external connection connector (not shown) of the ECU 18 so as to read out a value of the leak NG flag to know the result of the leak diagnosis. In the case of determination of leak abnormality, an alarm lamp 26, which is provided in an instrument panel and is connected to an output port of the ECU 18, is lighted so as to inform a driver of the abnormality presence.

According to the present embodiment, thus, after estimating the generated amount of evaporated fuel, corresponding to the change amount $\Delta$P1, the purge valve 14 is opened so as to introduce the negative pressure into the evaporated fuel processing system. After the internal pressure value $P_{tank}$ reaches the target pressure value $P_{trg}$, which is a predetermined value of negative pressure in the present embodiment, the purge valve 14 is closed. As a result, the evaporated fuel processing system is closed after the internal pressure value is changed to the target pressure value $P_{trg}$. After the closing thereof, the internal pressure value $P_{tank}$ of the evaporated fuel processing system changes in the order of the target pressure value $P_{trg}$, the peak pressure value $P_{tpeak}$, and target pressure value $P_{trg}$. It should be noted that the start timing for calculating the change amount $\Delta$P2 in the internal pressure of the evaporated fuel processing system is set to the timing t4 when just the set value t4' elapses from the timing t3' when the internal pressure value $P_{tank}$ reaches the peak pressure value $P_{tpeak}$. The set value t4' 10 is different in dependency on the conditions within the evaporated fuel processing system at the stage of introducing the negative pressure, in other words, the timing t4 is variably set in the period while the internal pressure value $P_{tank}$ returns from the peak pressure value $P_{tpeak}$ to the target pressure value $P_{trg}$. Therefore, since the calculation of change amount $\Delta$P2 is started after the inadequate pressure variation period, which may be caused near the peak pressure value $P_{tpeak}$, elapses, the accuracy of the amount estimation and further the diagnosis regarding the leak can be improved. In addition, since the calculation start timing of the change amount $\Delta$P2 is set before the internal pressure value $P_{tank}$ returns to the target pressure value $P_{trg}$, the time required for the leak diagnosis can be shortened, comparing the present embodiment with the conventional leak diagnosis.

The parameter for calculating the set value t4' is not limited only to the negative pressure introducing period (t2–t3) or the intake negative pressure value $P_{in}$ during the introduction of negative pressure, but includes the other parameters reflecting the internal conditions of the evaporated fuel processing system containing the fuel tank 5, such as the fuel temperature T or the remaining amount level L in the fuel tank 5.

In the case where the leak amount is large or a filler cap of the fuel tank 5 is removed, there is a possibility that the internal pressure value $P_{tank}$ does not reach the target negative pressure value $P_{trg}$. Therefore, in the case of the negative result of the determination at step 21 described above (the internal pressure value $P_{tank}$>the target negative pressure value $P_{trg}$), if a 10 predetermined time period of the negative pressure introduction period (the count value t2–t3) elapses, the leak diagnosis may be interrupted. In these cases, there is also the possibility that the internal pressure value $P_{tank}$ does not reach the peak pressure value $P_{tpeak}$ within the negative pressure holding period. Therefore, in the case also where the peak pressure value $P_{tpeak}$ is not detected as a detected value of the internal pressure value $P_{tank}$, the leak diagnosis may be interrupted. As a result, the diagnosis execution can be appropriately interrupted in the case where the leak diagnosis cannot be normally executed.

While there has been described what are at present considered to be preferred embodiments of the present invention, it will be understood that various modifications may be made thereto, and it is intended that the appended claims cover all such modifications as fall within the true spirit and scope of the present invention.

What is claimed is:

1. A diagnostic device of an evaporated fuel processing system for closing the evaporated fuel processing system including a fuel tank and then executing a leak diagnosis of the evaporated fuel processing system after changing an internal pressure thereof from a criterion pressure value to a target pressure value, comprising:

an internal pressure detection section for detecting an internal pressure value of the evaporated fuel processing system; and a diagnostic section for executing the leak diagnosis based on a change amount between the respective internal pressure values at a start timing and at a termination timing to calculate a pressure change therebetween, wherein said start timing is set on the basis of a timing when the internal pressure value detected by said internal pressure detection section reaches a peak pressure value, which is different from said target pressure value and occurs after the internal pressure value reaches the target pressure value and the evaporated fuel processing system is closed, and said termination timing is set at a later timing than the start timing.

2. The diagnostic device according to claim 1, wherein the diagnostic section variably sets said start timing in the period while the internal pressure value returns from said peak pressure value to said target pressure value.

3. The diagnostic device according to claim 1, wherein said diagnostic section sets a time period between said timing when the internal pressure value reaches said peak pressure value and said start timing based on internal conditions of the evaporated fuel processing system in a stage when the internal pressure of the evaporated fuel processing system is changed from said criterion pressure value to said target pressure value.

4. The diagnostic device according to claim 3, wherein said time period is set in accordance with a required time to change the internal pressure from said criterion pressure value to said target pressure value.

5. The diagnostic device according to claim 4, wherein said time period is set longer as said required time is longer.

6. The diagnostic device according to claim 3, further comprising:

an intake to introduce an intake pressure to change the internal pressure from said criterion pressure value to said target pressure value; wherein said time period is set in accordance with an intake pressure value when the intake pressure is introduced.

7. The diagnostic device according to claim 6, wherein said intake pressure is a negative pressure, and said time period is set longer as said intake pressure is smaller.

8. The diagnostic device of claim 1 wherein:

said peak pressure value is a maximum negative pressure value reached by said evaporated fuel processing system, and said start timing falls between said peak pressure value and said target pressure value and said termination timing falls between said target pressure value and said criterion pressure value.

9. The diagnostic device of claim 1 wherein the peak pressure value coincides with an extreme point in a pressure overshoot from said target pressure.

10. The diagnostic device according to claim 1, wherein the diagnostic section stops said leak diagnosis when the internal pressure value does not reach from said criterion pressure value to said target pressure value after a predetermined time elapses.

11. The diagnostic device according to claim 1, wherein the diagnostic section stops said leak diagnosis when the internal pressure value does not reach from said target pressure value to said peak pressure value after a predetermined time elapses.

12. The diagnostic device according to claim 1, further comprising:

a valve provided in the evaporated fuel processing system so as to mechanically regulate a pressure within said fuel tank.

13. A diagnostic method of an evaporated fuel processing system, for closing the evaporated fuel processing system including a fuel tank and then executing a leak diagnosis of the evaporated fuel processing system after changing an internal pressure thereof from a criterion pressure value to a target pressure value, comprising:

a first step of changing the internal pressure of the evaporated fuel processing system from said criterion pressure value to said target pressure value and closing the evaporated fuel processing system;

a second step of setting a start timing for calculating a pressure change within the evaporated fuel processing system, said start timing being set on the basis of a timing when the internal pressure value in the evaporated fuel processing system reaches said peak pressure value, which peak pressure value is different from said target pressure value; and a third step of executing the leak diagnosis of the evaporated fuel processing system based on a change amount between the internal pressure value at said set start timing and the internal pressure value at a termination timing which is set so as to come after the start timing.

14. The diagnostic method according to claim 13, wherein the second step variably sets said start timing in a period while the internal pressure value returns from said peak pressure value to said target pressure value.

15. The diagnostic method according to claim 13, wherein the second step sets a time period between said timing when the internal pressure value reaches said peak pressure value and said start timing based on internal conditions of the evaporated fuel processing system in a stage when the internal pressure of the evaporated fuel processing system is changed from said criterion pressure value to said target pressure value.

16. The diagnostic method according to claim 13, wherein said leak diagnosis is stopped when the internal pressure value does not reach from said target pressure value to said peak pressure value after a predetermined time elapses.

17. The diagnostic method according to claim 13, wherein said leak diagnostic is stopped when the internal pressure value does not reach from said criterion pressure value to said target pressure value after a predetermined time elapses.

18. The diagnostic method according to claim 15, wherein said time period is set in accordance with a required time to change the internal pressure from said criterion pressure value to said target pressure value.

19. The diagnostic method according to claim 18, wherein said time period is set longer as said required time is longer.

20. The diagnostic device according to claim 15, further comprising:

an intake to introduce an intake pressure to change the internal pressure from said criterion pressure value to said target pressure value; wherein said time period is set in accordance with an intake pressure value when the intake pressure is introduced.

21. The diagnostic device according to claim 20, wherein said intake pressure is a negative pressure, and said time period is set longer as said intake pressure is smaller.

22. The diagnostic device of claim 13 wherein the peak pressure value coincides with an extreme point in a pressure overshoot from said target pressure.

* * * * *